Figure 1:
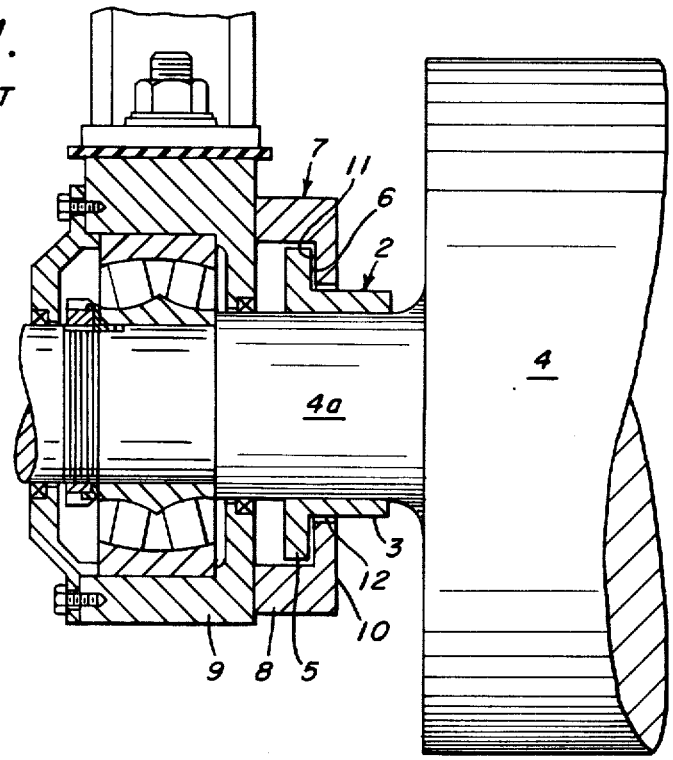

United States Patent [19]
Paradine

[11] 3,893,674
[45] July 8, 1975

[54] NON-FRICTIONAL CLOSURE FOR EXCLUSION OF CONTAMINANTS

[75] Inventor: Terry E. Paradine, Gary, Ind.

[73] Assignee: United States Steel Corporation, Pittsburgh, Pa.

[22] Filed: Dec. 26, 1973

[21] Appl. No.: 428,469

[52] U.S. Cl. .............................. 277/56; 308/187.1
[51] Int. Cl. ......................................... F16j 15/44
[58] Field of Search ............ 308/361, 187.1, 187.2; 277/53, 55, 56

[56] References Cited
UNITED STATES PATENTS
2,003,605  6/1935  Oelkers ............................. 277/56

*Primary Examiner*—Robert I. Smith
*Attorney, Agent, or Firm*—Arthur J. Greif

[57] ABSTRACT

Closures are presently employed to prevent external contaminants such as dust and liquids from entering bearing housings at the region of clearance between the shaft and the housing. One such closure relies on the use of mated, washer-like surfaces wherein such surfaces are perpendicular to the axis of the shaft. Exclusion of contaminants is enhanced, by inclining the surfaces toward the direction of ingress of the contaminating substances, at an angle of about 10-40°.

4 Claims, 5 Drawing Figures

PATENTED JUL 8 1975　　　　　　　　　　3,893,674

SHEET 1 OF 2

NON-FRICTIONAL CLOSURE FOR EXCLUSION OF CONTAMINANTS

This invention relates to non-frictional seals or closures for preventing contaminants from entering housings at the clearance between such housings and a rotating shaft, and is more particularly related to excluding contaminants from bearings and mountings contained within such housings.

It will be clear that the instant closure is generally applicable for excluding external contaminants from various mechanisms employing a shaft and a bearing housing. However, the features can more easily be understood by reference to specific applications wherein it is particularly difficult to exclude such contaminants. One such application, is the exclusion of highly corrosive liquids from bearing housings associated with rollshafts of electroconductive rolls used in high speed plating of sheet and strip. Presently, such conductor roll assemblies employ clipper seals, mounted on the shaft and bolted to the bearing housing. To ensure adequate exclusion of contaminants, it is necessary that such seals be in tight frictional engagement with the shaft. If not unduly worn, these seals do effectively exclude dirt and corrosive liquids from the bearings. However, should the clipper seal become worn before a roll is removed for servicing, there is the tendency for contaminants to reach the bearings. Even when such seals are not worn, they are subject to a number of disadvantages. Thus, because of the excessive friction required for providing adequate protection, a severe load is placed on the motor that drives the roll. Additionally, when a roll assembly is taken off the line for changing or repair, all the clipper seals must be removed and replaced. The resultant removal and replacement costs can be quite expensive It is therefore a principal object of this invention to provide a simple means for effectively preventing contaminants from reaching bearings.

It is a further object of this invention to provide a seal system which can be easily installed and removed.

It is yet another object of this invention to provide a substantially frictionless seal, which does not contribute to loading the drive motors.

Figure 2:
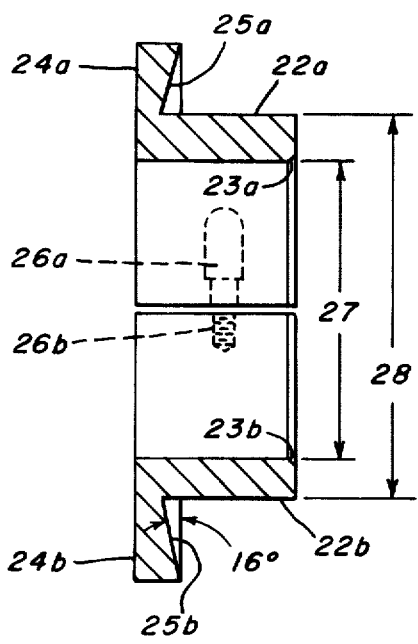
Figure 3:
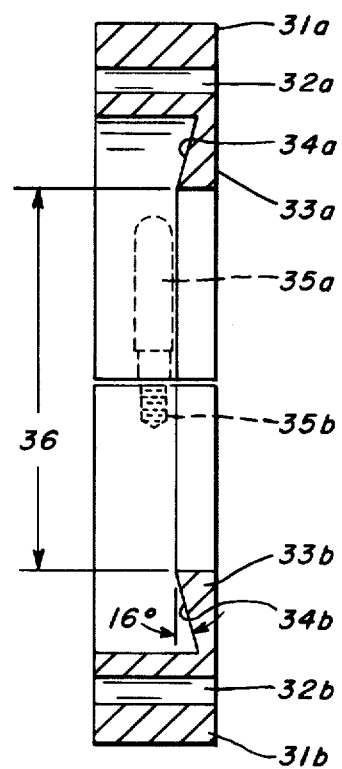
Figure 4:
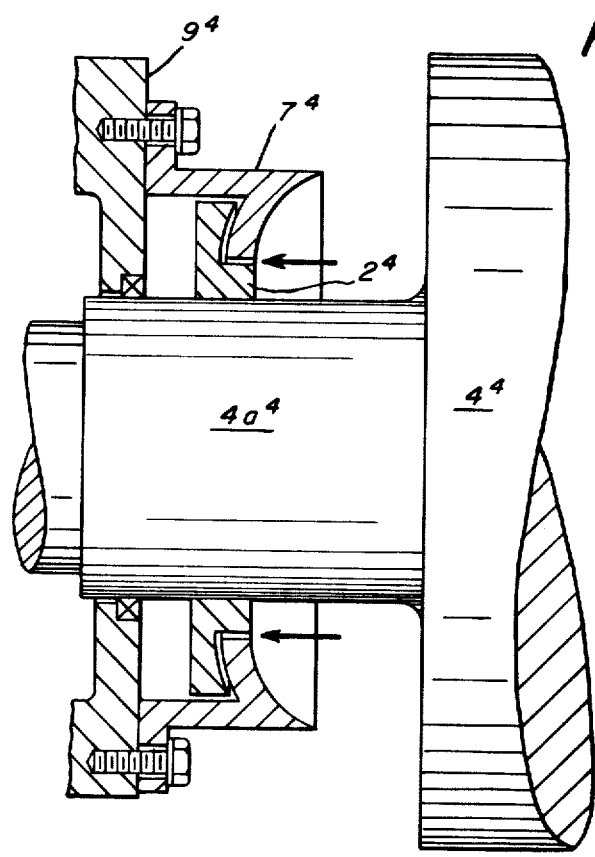
Figure 5:
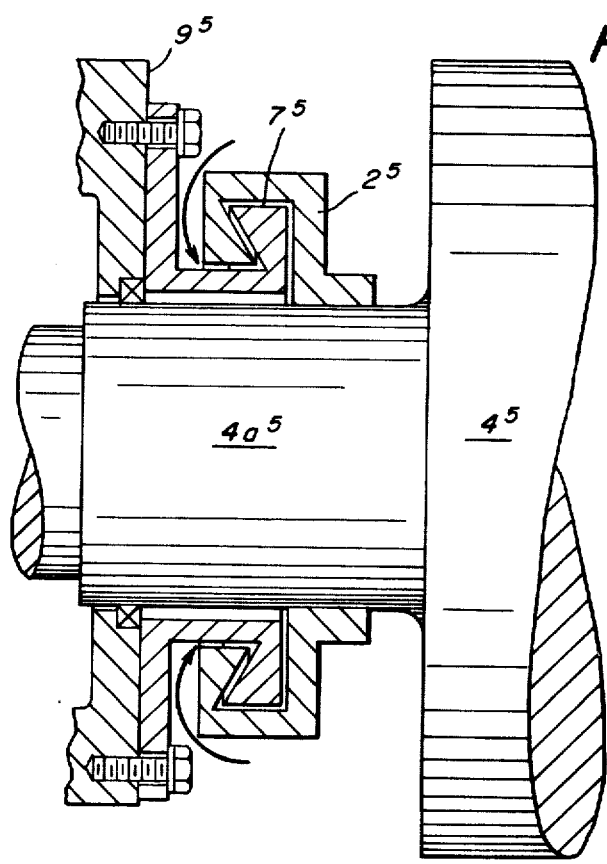

These and other objects and advantages of the instant invention will be better appreciated by reference to the following description together with the appended claims and the drawings in which:

FIG. 1 is a cross-sectional representation of a conventional non-frictional closure, and FIGS. 2 and 3 illustrate a preferred embodiment of the inventive closure, as it is employed in a conductor roll assembly, and FIGS. 4 and 5 provide examples of additional closure configurations employing the principle of the instant invention.

To overcome the excessive drag caused by the clipper seal, a water thrower closure (e.g. as shown in Kent's, Mechanical Engineer's Handbook, Design and Shop Practice Volume, 11th Edition 13-08, 13-09) was installed on the conductor roll-shaft. The basic features of such a closure are shown in cross-section in FIG. 1. This type of closure includes a rotatable member 2 and housing member 7. The rotatable member is composed of a sleeve portion 3 (outwardly displaced from the bearing housing) that is fixed to, for rotation with the roll 4 and its associated shaft 4a, and a flange portion 5, with a washer-like face 6, for mating with a similar washer-like face 11 of the housing member 7. The housing member is similarly composed of a portion 8 for attachment to the housing 9, and a flange portion 10 with washer-like face 11 for mating as explained above.

It may be seen that in such a conventional closure, the plane defined by the faces is orthogonal with respect to the shaft axis. The sections may be made of various materials, e.g. bronze, plastic, etc., depending on the intended usage and the environment. This conventional type of closure will generally provide adequate exclusion of contaminants when there is no clearance between the faces 6 and 11, i.e., when the mated faces are pressed laterally against each other. However, the use of such lateral pressure creates a drag on the drive motors of a magnitude similar to that created by clipper seals. In some instances, with a small clearance of, for example 0.0002 inches, this conventional closure can provide adequate exclusion when the liquid reaches the opening 12, with but very little force. It was found, however, under conditions of open splashing, such as exist in high speed electrotinning lines, wherein the corrosive liquid is thrown at the opening with considerable force; that this type of closure was totally unacceptable. Thus, utilizing the closure of FIG. 1, it was found after about one week of operation on such a line, that considerable amounts of acid and dirt had entered the bearing housing.

In an attempt to overcome this problem, and nevertheless achieve an essentially non-frictional closure, the mated faces were inclined (e.g. as in FIGS. 2 and 3) at various angles toward the direction of ingress of the liquid contaminants. When the inclination of the faces was 5° from said orthoganal plane, some improvement was noted after a similar one week trial. However, while the degree of bearing contamination had decreased, there was still an unacceptable amount of liquid and dirt which had entered the closure. It was found that with inclinations of about 10° or greater (i.e., angles of about 50°-80° with respect to the shaft axis), that virtually total exclusion could be achieved. The closure of FIG. 2, with the faces inclined at an angle of 16°, has now been in successful operation for a period of about one year, with no noticeable contamination from either corrosive liquid or dirt particles.

FIGS. 2 and 3 illustrate the constructional details of the instant closure, incorporating a preferred split-section feature for ease of removal and installation. As shown in FIG. 2, the rotatable member consists respectively of top and bottom sleeve portions 22a and 22b, with corresponding bevels 23a and 23b for ease in sliding onto the shaft during installation. Flanges 24a and 24b are machined to provide faces 25a and 25b with a desired angle within the prescribed range. Holes 26a set tangential to the bore of the sleeve portion, on opposite sides thereof, are provided with threaded ends 26b to receive bolts (not shown) for clamping bore surface 27, to tightly engage to the circumferential surface of the shaft.

FIG. 3 depicts a housing member, complimentary to the above rotatable member. Top and bottom sections of the split members are noted with the subscripts a and b as in the above figure. Cylindrical portions 31a and 31b are provided with holes 32a and 32b for fixed attachment into threaded holes (not shown) within the bearing housing. Flange portions 33a and 33b are machined to provide faces 34a and 34b angled to parallel nd thereby nonfrictionally mate with corresponding angled faces 25a and 25b of the rotatable member (FIG. 2). The cylindrical portions are also provided with tangential holes 35a terminating in threaded ends 35b, to receive bolts (not shown) to enable the top and bottom sections to be clamped together tightly. The inner diameter 36 of the housing member should be sufficiently larger than the outer diameter 28 of the sleeve portion of rotatable member to permit the free rotation thereof and thereby eliminate any possibility of drag on the drive system. The clearances between these inner and outer diameters is not critical, and can be sufficient to accommodate situations in which bearing wear has caused slight eccentricity or shaft run-out. Thus, a clearance of one-eighth inch has been employed in the particular application noted above wherein the closure has been operated successfully for period of almost 1 year.

The closure system of FIGS. 2 and 3 is installed by first placing the rotatable member on the shaft; with the inclined washer-like surface facing the direction of ingress of the contaminating substances. The tangential bolts are tightened, but loosely enough to permit this member to be pushed to the housing. The housing member is then attached to the bearing housing and the separate sections clamped together, so that the flange portions 24a and 24b of the rotatable member are now contained with the walls of the housing and the flange portions 33a and 33b of the housing member. The rotatable member is then pulled toward the housing member, so that the mated washer-like faces of the two members are in contact. Contact having been made, the rotatable member is then pushed away slightly to achieve a desired clearance between the faces. Clearly, the smaller the clearance, the more effective will be the closure. However, due to the prescribed inclination of the faces, clearances of from about 0.0001 to 0.05 inches can now be employed and nevertheless achieve effective exclusion. Proper clearance having been attained, the tangential bolts of the rotatable member are now tightened to clamp this member to the shaft.

It should be understood that various modifications may be employed without departing from the principles of the invention. Thus, the term "washer-like face" is not limited to a surface defined by concentric circular perimeters. For example, (a) the inner and/or outer perimeters of the faces may be polyganol, or (b) the inner and outer perimeters may be eccentric with respect to one another. It is only requisite (i) that they provide a continuous mated surface encircling the circumference of the shaft, (ii) that the planes defined by the two surfaces do in fact make (i.e., are parallel) with each other and (iii) that they are inclined at least 10° with respect to a plane orthoganol to the shaft axis. FIGS. 4 and 5 provide illustrative examples of two additional configurations employing these three requisites. FIG. 4 shows that the washer-like faces may be curvilinear, so long as they provide mated surfaces which are inclined to the proper extent toward the direction of ingress of the contaminant. In such a case, the angle of inclination of the faces is measured from the tangent to the curve, at the mated portion thereof closest to the shaft. In FIG. 5, the mated faces are inclined inwardly, i.e., towards the housing. However, it may be seen that the mated faces are nevertheless inclined toward the direction (as shown by the arrow) of contaminant ingress.

I claim:

1. In an apparatus which includes a rotating, generally cylindrical shaft; a housing circumscribing a journaled portion of said shaft, said housing having a clearance between it and the shaft; a closure for sealing said clearance against the entry of contaminating substances, said closure comprising (i) a shaft-connected member having a bore, the surface of which is in tight engagement with an outwardly displaced circumferential portion of said shaft, said shaft-connected member having a flange portion with a washer-like face, and (ii) encircling said shaft, a housing-connected member having a flange portion with a washer-like face for nonfrictionally mating with the washer-like face of said shaft-connected member, whereby said housing-connected and shaft-connected members form a substantially enclosed chamber sealed against the entry therein of said contaminating substances, the improvement wherein said mated washer-like faces are inclined toward the direction of ingress of said contaminating substances, at an angle of from about 10°–40° with respect to a plane orthoganol to the axis of said shaft.

2. The apparatus of claim 1, wherein the angle of inclination of said mated faces is greater than about 15°.

3. The apparatus of claim 2, wherein the normal distance between said mated washer-like faces is within the range of from 0.0001 to 0.05 inches.

4. The apparatus of claim 3, wherein said washer-like surface of the shaft-connected member is outwardly facing and the corresponding mated washer-like surface of the housing-connected member is inwardly facing.

* * * * *